Aug. 25, 1964
R. DONGUY ETAL
3,146,171
APPARATUS FOR DETECTING FAULTS IN THE
CASINGS OF FUEL RODS EMPLOYED
IN A NUCLEAR REACTOR
Filed Sept. 14, 1960
3 Sheets-Sheet 2
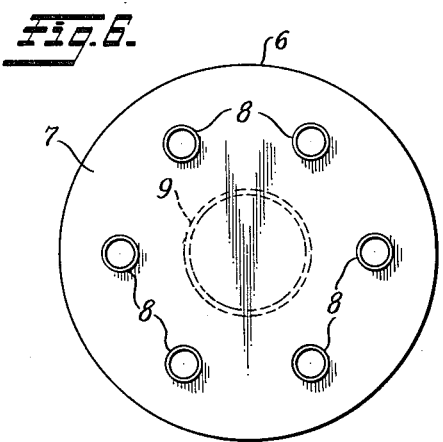
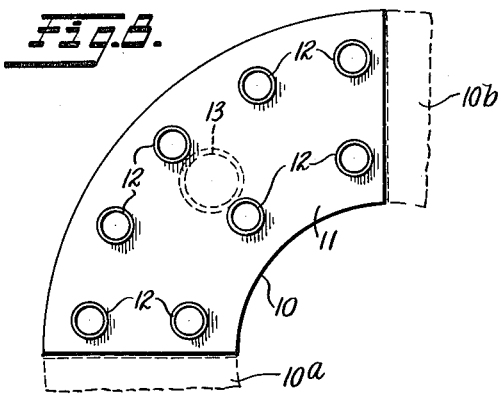
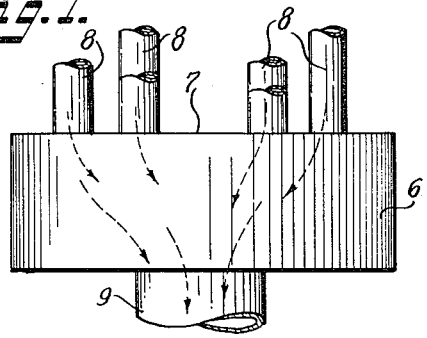
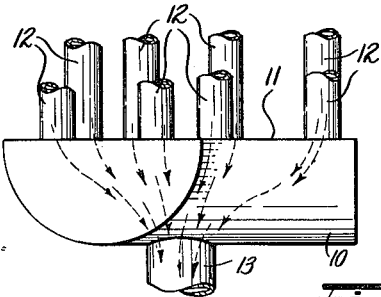
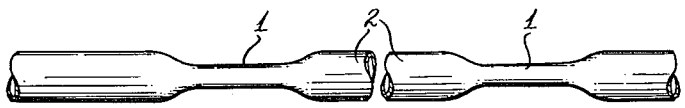
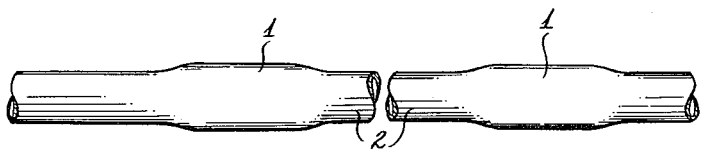
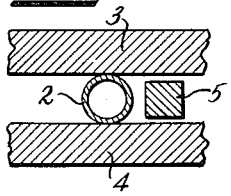
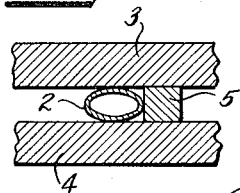
INVENTORS
René Donguy
Jean Mégy
BY Bacon & Thomas
ATTORNEYS INVENTORS
René Donguy
Jean Mégy
BY Bacon & Thomas
ATTORNEYS 3,146,171
APPARATUS FOR DETECTING FAULTS IN THE CASINGS OF FUEL RODS EMPLOYED IN A NUCLEAR REACTOR
René Donguy, Vanves, and Jean Mégy, Bourg-la-Reine, France, assignors to Commissariat a l'Energie Atomique, Paris, France
Filed Sept. 14, 1960, Ser. No. 56,016
Claims priority, application France Oct. 3, 1959
7 Claims. (Cl. 176—19)

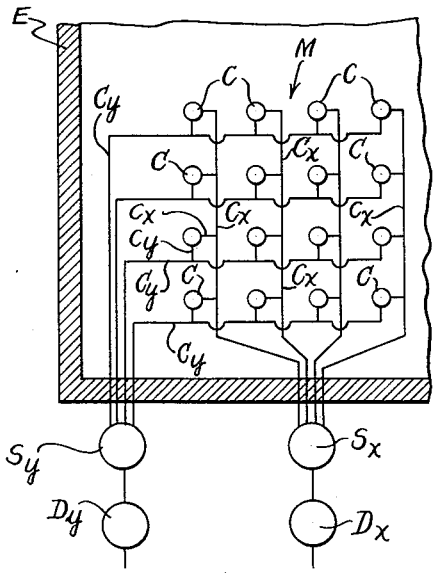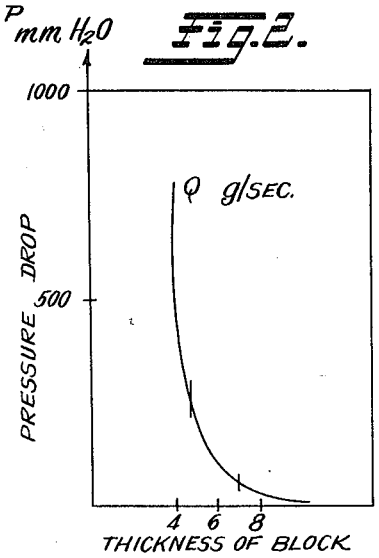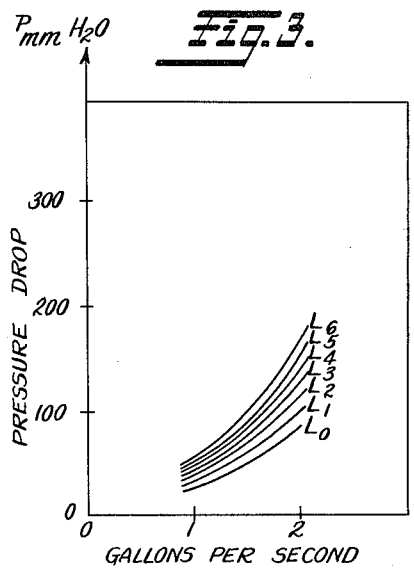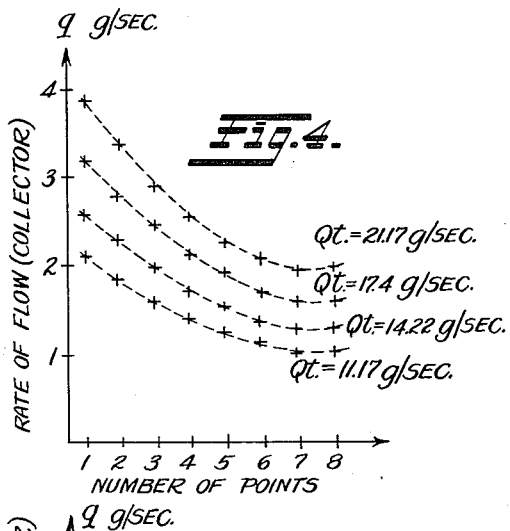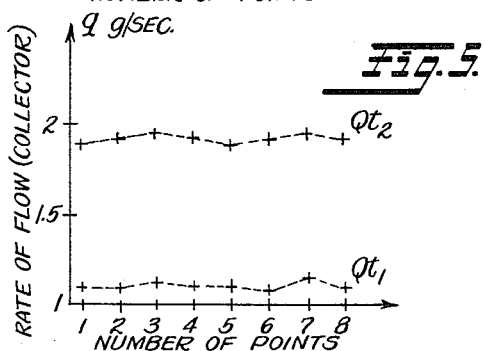

This invention relates generally to a method for determining defects in the casings of fuel rods employed in nuclear reactors and to apparatus therefor. More specifically, the invention involves a matrix system wherein the outputs are balanced.

It is known that in heterogeneous nuclear reactors, wherein cooling is effected by a liquid or gaseous fuel circulating in the channels which contain the fuel rods, the fuel rods are separated from the cooling fluid by means of sealed envelopes or casings, usually formed of magnesium or a magnesium-aluminum alloy. These casings are to prevent the fission products which appear in the fuel during operation of the reactor from escaping into the cooling fluid, thereby contaminating this fluid and preventing it from reacting with the fuel. It is therefore important to detect as soon as possible any deterioration, such as cracking or corrosion, which could affect the casing. Such deterioration can accelerate rapidly and the operator supervising the operation of the reactor must therefore be provided with rapid detection means so that he can immediately take the necessary precautions when a fault is detected.

In present day nuclear reactors such detection means involve sampling the cooling fluid taken from the outlet of each channel and measuring the activity by a detector. However, in order to avoid the provision of a detector for each channel, an "inspection detector" is allocated to a group of channels each of which is examined in succession. In order to effect more rapid supervision the channels within such a group can be connected together to form an assembly. Thus the total activity of each group may be inspected in a continuous cyclic manner and when the activity of one of these groups is found to be abnormal each channel of the group is inspected in turn by another detector, called a "follower detector."

Although these devices are relatively simple in operation they have several disadvantages. In the first place, it is necessary to employ a large number of control members, such as electro-valves, rotary selectors and the like, in order to direct the fluid samples sequentially from the individual assemblies to the detection apparatus associated with these assemblies. Furthermore, a follower detector is required to identify the specific faulty channel of any group, and this follower detector is not utilized again until another abnormality is detected in the same assembly. The identification occurs at the beginning of the cycle measuring the activity of the channels of the particular assembly, in order to permit calibration of the measuring apparatus.

For this reason it has already been recognized that it would be desirable to arrange detection devices in such a way that identification of a particular faulty channel can be effected exclusively by means of tests on the groups of channels. This would result in a more rapid identification of the defective channel and only one type of detector would be required instead of the inspection and follower detectors necessary in conventional arrangements. To this end matrix systems for sampling the fluid in reactor channels have been proposed, i.e., systems in which the samples taken from any one channel are directed to both a row collector and a column collector, and wherein detector devices are connected to each of the collectors.

The present invention contemplates a system comprising N tubes for sampling the cooling fluid, each of the tubes being fed by one of the N channels of the reactor. The tubes are arranged in a square matrix comprising $n$ rows and $n$ columns and therefore N equals $n^2$. Each tube of this matrix terminates in two distinct branch pipes, one of which directs fluid samples to a row collector and the other of which directs fluid samples to a column collector. Thus all of the tubes in any one row of the matrix are connected to a single row collector, and all of the tubes in any one column of the matrix are connected to a column collector. The various row collectors are, in turn, placed in communication with a single detector through selector means and similarly the various column collectors are placed in communication through selector means with a second detector which may be identical to the one associated with the row collectors.

In principle, the normal operation of this matrix system consists of inspecting the row collectors and inspecting the column collectors of the matrix. When a fault appears in any one reactor channel the particular channel is identified by analyzing the activity measurements affected by the single row collector and the single column collector with which it is in communication. Thus the detector identifies the faulty pipe solely by measuring the activity of groups of pipes rather than having to sample each particular pipe of one group. The foregoing operation, however, requires certain conditions. In the first place the unit pressure of the fluid samplings reaching the row collectors from the channels of any one row in the matrix must be of the same value, $q_y$, and the unit pressure of fluid samplings reaching the column collectors from the channels of any one column of the matrix must have the same value, $q_x$. Similarly, the fluid samplings from the various row collectors must have the same unit pressure, $Q_y$, at the row selector, and the fluid samplings from the various column collectors must have the same unit pressure, $Q_x$, at the column collectors. Where the row and column detectors are of the same kind the pressure $q_x$ should be equal to the pressure $q_y$ and the pressure $Q_x$ should be equal to the pressure $Q_y$. This equilibrium in the unit pressures and the resultant equilibrium in the rates of flow must be effective for a given normal output of the cooling fluid and must remain so within forseeable variations in output.

The physical means for introducing pressure drops are preferably provided by merely constricting the tubes, the constriction being defined as a function of its diameter and its length and of the nominal output flowing therethrough. However, it is also possible to effect the constrictions by introducing sleeves of predetermined measurement within the pipes.

The invention characterized above is practical in operation and has a number of advantages over any attained by conventional arrangements. In the first place the assembly, including the channel sampling pipes, the row and column branch pipes and the row and column collectors, is completely static and is compact enough to be located within the sealed housing of the reactor in the immediate proximity of the channel outlets. It can be subjected to the action of a high flux of neutrons and to high temperatures without risking any interference with its operation. The assembly thus insures balanced sample outputs from each of the channels without requiring movable or detachable balancing means. Furthermore, the construction of the reactor is simplified because the number of pipes passing through its sealed walls is substantially reduced. Similarly, the number of cocks, valves and connecting members is reduced, with an attendant saving in the cost of the apparatus, and only a single type of detector is necessary.

Other objectives and advantages will be apparent from the following description when read in conjunction with the accompanying drawings, in which:

FIG. 1 is a schematic view illustrating how the sampling pipes fed by the channels of a reactor are arranged in a square matrix in order to use a device for detecting faults in casings by means of a matrix sampling system balanced according to the invention;

FIG. 2 is a graph illustrating curves of variations in the losses of pressure obtained in a pipe provided with constrictions;

FIG. 3 is a graph illustrating curves of variations of the losses of pressure obtained in a pipe provided with constrictions;

FIG. 4 is a graph illustrating, for certain predetermined values of the total output of cooling fluid in a collector, what are the respective outputs in the sampling channels connected to this collector in the case where this sampling system is not balanced;

FIG. 5 is a graph illustrating the value of these respective outputs after balancing of this elementary sampling system;

FIG. 6 is a top plan view of a collector adapted to be used in the device of FIG. 1;

FIG. 7 is an elevational view of the collector of FIG. 6;

FIG. 8 is a plan view of a modified form of the collector;

FIG. 9 is the front elevation of the collector of FIG. 8;

FIG. 11 is a fragmentary elevation illustrating a pipe section provided with constrictions disposed in the same plane;

FIG. 12 is a fragmentary plan view of the pipe section of FIG. 11;

FIG. 13 is a diagrammatic view of a device for producing elementary constrictions;

FIG. 14 is a diagrammatic view of the device of FIG. 13 in operating position;

Figure 10:
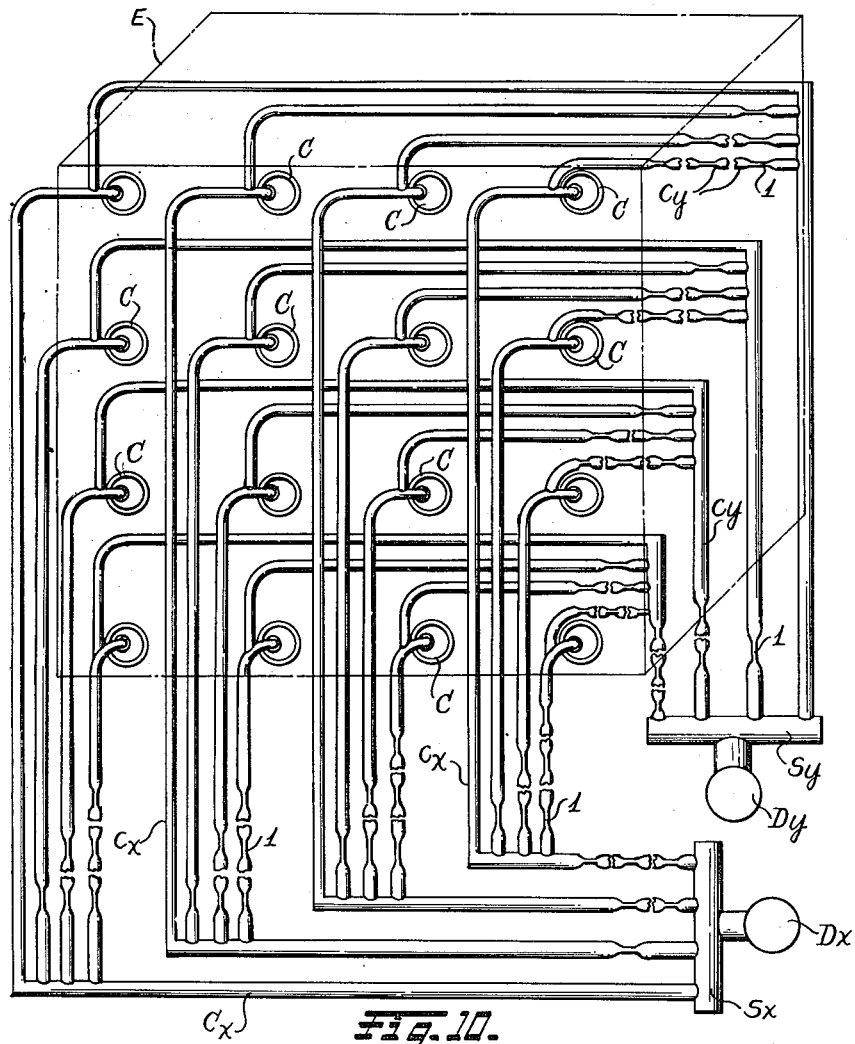
FIG. 10 is a partially fragmentary schematic view of a matrix system provided with constrictions for detecting faults in nuclear reactor casings.

Referring now to FIGURES 1 and 10, these figures illustrate in a partially diagrammatic manner the housing E of a heterogeneous reactor under pressure. The housing is adapted to contain a large number of channels wherein the fuel elements are positioned and wherein the cooling fluid circulates. In the present invention a plurality of pipes C are provided for sampling the cooling fluid, each pipe being fed by one of the N channels of the reactor. The pipes C are arranged in a square matrix M comprising $n$ rows and $n$ columns ($n$ equals 4 in FIGS. 1 and 10). Each pipe C terminates in two distinct sampling channels or branch pipes. One branch pipe $c_y$ is connected to a row collector $C_y$, and the other branch pipe $c_x$ is connected to a column collector $C_x$.

The row collectors $C_y$ of the matrix M are all connected to a single manifold $S_y$ which is a selector having $n$ passageways, 4 in the present example, capable of successively connecting the individual row collectors $C_y$ to a single detector $D_y$. Similarly, the column collectors $C_x$ of the matrix M are all connected to a single manifold $S_x$, which is a selector having $n$ passageways, 4 in the present example, capable of successively connecting the individual column collectors $C_x$ to a single detector $D_x$.

It will readily be seen that the matrix system described provides a convenient means for identifying a faulty channel in the reactor. When an abnormality occurs it is detected simultaneously by one row colletcor $C_y$ and one column collector $C_x$. Only one channel corresponds to both of these and this one may be readily identified.

As stated above, the present device gives reliable indications only if the values $q_x$ and $q_y$ in the row and column sampling channels respectively are equal, and only if the values $Q_x$ and $Q_y$ in the row and column collectors respectively are equal. This is accomplished by providing the various pipes with a variable number of physical restricting means, each serving to introduce a predetermined uniform pressure drop into the flow of fluid circulating therethrough. A particularly simple and economical manner for effecting this result is by merely constricting the individual pipes. More precisely, a uniform constriction is selected in accordance with the type of matrix as a function of the diameter of the pipes, their length and the nominal output flowing therethrough. This uniform constriction is reproduced as many times as necessary to balance the system.

In the sixteen-channel reactor of FIG. 10 the constrictions are indicated by the numeral 1. FIGS. 11 and 12 illustrate respectively a front view and a plan view of two standard constrictions 1.

A convenient way for reproducing a plurality of standard constrictions in the pipe is illustrated in FIGS. 13 and 14 which show the tube being squeezed between jaws 3 and 4. The closing of the jaws 3 and 4 is limited by blocks 5 of a given thickness positioned therebetween.

For example, in a particular case, a tube of $\phi$ 10 x 12 mm., a block of thickness of 6 mm. and jaws of 23 mm. in length are chosen. The representative curve of the loss of pressure $p$ as a function of the output $Q$, $p=f(Q)$, of a single constriction is a parabola approximating a straight line within the limit of utilisable outputs.

A co-efficient K of loss of pressure is defined as follows:

$$K = \frac{p}{\rho \frac{V^2}{2}}$$

where $p$=loss of pressure, $V$=velocity of flow of the fluid, $\rho$=constant coefficient.

In the case of a pipe of $\phi$ 10 x 12 mm. and with the constriction defined above, $K=0.7$.

Experiments have shown that the pipes must not be squeezed too much if the formula relating to the constriction is to remain sufficiently true.

The curve of FIG. 2 shows for a certain output Q (g./sec.) the loss of pressure $p$, expressed in mm. $H_2O$, plotted as a function of the thickness of the block 5 for a tube of $\phi$ 10 x 12 mm. This curve shows that the thickness of the block must be between 5 and 7 cm.

In addition, it is interesting to find that the loss of pressure due to an elementary constriction is additive, because it is sometimes necessary to have several constrictions in series. The loss of pressure caused by a series of consecutive constrictions more or less equally spaced has been measured. The curves $L_0$ to $L_6$ of FIG. 3 relate to a pipe of $\phi$ 10 x 12 mm. and 1 m. in length in which constrictions 0, 1, 2, 3, 4, 5 and 6 have been successively formed with a distance of 8 cm. between successive constrictions. The minimum distance which must be present between two consecutive constrictions in order to obtain conditions of independence is substantially $8d$ ($d$=diameter of the pipe). The curves of FIG. 3 show as ordinates the losses of pressure $p$, expressed in mm. $H_2O$, plotted as a function of the output Q, expressed in g./sec., as abscissae.

Figure 16:
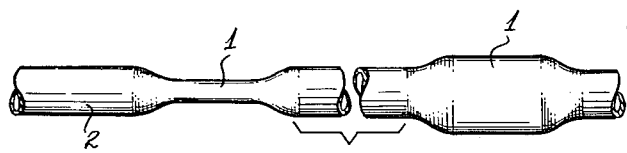
FIG. 16 is a fragmentary elevation of another modification comprising a pipe section provided with two constrictions, the median planes in which these constrictions have been produced passing through the axis of the pipe perpendicular to each other.

From the curves of FIG. 3 it is apparent that the value of the coefficient K for two constrictions is double the value of the coefficient K for one constriction and so on. It has also been found that it is effective to vary the orientation of the planes of the constriction in order to preserve the conditions of independence and thus make them truly additive. Thus (see FIG. 16), the planes of two consecutive constrictions 1 are turned through 90°, which also tends to enhance the rigidity of the pipe 2.

The influence of bends in a pipe on the loss of pressure is very slight and, for radii of curvature greater than $8d$ ($d$=diameter of the pipe), no appreciable additional loss of pressure was observed.

The unbalance of the losses of pressure observed in the case of sampling channels of equal length connected to a collector is greater with a collector of $\phi$ 21 mm. than with a collector of $\phi$ 25 mm., for example. It is thus concluded that it is of advantage to increase the cross-section of the collector pipes.

It will be understood that if the row or column collectors have different lengths, it is necessary to balance their outputs.

FIGURES 4 and 5 are graphs in which the ordinates represent, for different values of the total output $Q_t$ passing through a collector of circular cross-section, the different values expressed in grams/second of the partial outputs $q$ in the sampling channels discharging into this collector, numbered 1, 2, 3 . . . 8, and the abscissae represent the number of points. FIG. 4 corresponds to such an elementary sampling system which has not been balanced in accordance with the invention, and it will be seen that the partial outputs in the different sampling channels are largely a function of the particular position of the connecting point of each of these channels with the collector. On the other hand, FIG. 5, which corresponds to the case where this same system has been balanced according to the invention, shows that the value of these partial outputs has been equalised.

The system can be improved by using collectors other than cylindrical pipes into which the sampling channels discharge.

Theoretically, the best kind of collector would be that illustrated in FIGS. 6 and 7. This collector comprises a sealed cylindrical chamber on the upper face 7 of which the sampling channels such as 8 are arranged in a circle, the collector being connected to the corresponding selector by means of a lower central pipe 9.

Satisfactory results have also been obtained with collectors comprising a quarter of a toroid 10 cut off in the equatorial plane as shown in FIGURES 8 and 9. This toroidal section is connected by its plane equatorial surface 11 to sampling channels such as 12 of which there are eight equally spaced over this surface 11. The collector is connected to the corresponding selector by means of the pipe 13.

The forms of the collectors of FIGS. 6 to 9 have the advantage of considerably reducing the differences in losses of pressure along the different paths in the collectors. In fact, all the connections of the sampling channels discharge into a common chamber instead of discharging along a common pipe-line; the assembly is thus made much more symmetrical which makes for easier balancing. In addition, in the case shown in FIGS. 8 and 9, it is possible to provide an area at the center of the four collectors, two of which 10a and 10b are partially indicated in dotted lines in FIG. 8, for members such as rods for controlling the reactor or charging and discharging apparatus.

Generally speaking, collectors are chosen of a form which permits the most symmetrical arrangement of the row or column sampling channels and the provision of a relatively large chamber into which the channels discharge.

Figure 15:
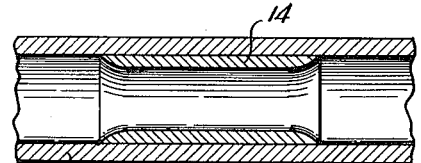
FIG. 15 is a sectional view of a modification comprising a pipe section provided with a sleeve.

It is also possible to balance a matrix system for sampling the cooling fluid by means of sleeves such as 14 (FIG. 15) having a predetermined internal diameter and length and introduced into the pipes such as 2 in sufficient number according to the loss of pressure desired. The dimensions of these sleeves are defined so as to introduce a fixed loss of pressure but also to make possible a simple reproduction in series. This may be desirable, since if it is required to produce a considerable loss of pressure by means of a single sleeve, the dimensions of this sleeve must be extremely accurate. These sleeves can be introduced into a pipe previously constricted at one end to serve as an abutment and held at the other end by another constriction after the introduction of the number of sleeves corresponding to the loss of pressure desired.

We claim:

1. Apparatus for detecting faults in the channels of a nuclear reactor, comprising: a plurality of sampling pipes associated with the channels of the reactor and arranged in a matrix of rows and columns, one sampling pipe being associated with each of said channels; a pair of branch pipes connected to each of said sampling pipes; a row collector manifold provided for each row of said matrix and connected to each sampling pipe in said row through one set of the said pairs of branch pipes associated therewith; a column collector manifold provided for e ach column of said matrix and connected to each sampling pipe in said column through the other ones of said pairs of branch pipes associated therewith; row and column selector means selectively connecting all of said row and all of said column collector manifolds respectively to detector means associated with said selector means for determining faults occurring in the nuclear reactor; and constriction means disposed in certain of the respective flow paths between the channels and the selector means to compensate for pressure drops in said flow paths and thereby equalize the resultant pressures at which the samplings are received at the respective detectors during normal operating conditions.

2. Apparatus for detecting faults in the channels of a nuclear reactor, comprising: a plurality of sampling pipes associated with the channels of the reactor and arranged in a matrix of rows and columns, one sampling pipe being associated with each of said channels; a pair of branch pipes connected to each of said sampling pipes; a row collector manifold for each row of said matrix and connected to each sampling pipe in said row through one set of the said pairs of branch pipes associated therewith; a column collector manifold provided for each column of said matrix and connected to each sampling pipe in said column through the other ones of said pairs of branch pipes associated therewith; a selector manifold connecting said row collector manifolds selectively to a detector for determining faults occurring in the nuclear reactor; a second selector manifold connecting said column collector manifolds selectively to a second detector for determining faults occurring in the nuclear reactor; and constriction means disposed in the respective flow paths between the channels and the selector manifolds to compensate for pressure drops in said flow paths and thereby equalize the resultant pressures at which the samplings are received at the respective detectors during normal operating conditions.

3. The apparatus of claim 2 wherein said constriction means comprises constrictions provided between said channels and said row collector manifolds and column collector manifolds, respectively, and also constrictions provided between said row collector and column collector manifolds and the first and second selector manifolds, respectively, connected therewith.

4. The apparatus of claim 3 wherein said constrictions comprise a plurality of like dimensioned constrictions selected connections between said channels and said connector manifolds and between said collector manifolds and said selector manifolds comprising the fault detecting system being provided with a predetermined number of spaced constrictions in spaced serial relation chosen to equalize pressures in the system by accommodating for pressure losses occurring therein.

5. The apparatus of claim 4 wherein said constrictions are provided by internal sleeves within the pipes which form said connections.

6. The apparatus of claim 5 wherein said constrictions are formed by opposed wall portions of pipe portions forced towards each other out of their normal circular disposition.

7. The apparatus of claim 6 wherein the transverse diametrical axes through the opposed wall portions of consecutive constriction in spaced relationship in the same pipe portions are disposed at right angles with respect to one another.

References Cited in the file of this patent

"Elements of Chemical Engineering," Badger and McCabe, McGraw-Hill, 1936, p. 40.

WAPD–BT–3 (Atomic Energy Commission), Bettis Technical Review, "The Theory of Failed Fuel Elements Location and Detection," by P. W. Frank and K. H. Vogel, vol. 1, No. 3, August 1957, pp. 108–109.